(12) United States Patent
Zolli et al.

(10) Patent No.: US 9,151,525 B2
(45) Date of Patent: Oct. 6, 2015

(54) METHOD OF OPERATING AN EVAPORATOR ASSEMBLY WITH A FAN CONTROLLER (71) Applicant: National Refrigeration & Air Conditioning Canada Corp., Brantford (CA)

(72) Inventors: Vince Zolli, Brantford (CA); William J. Mead, Paris (CA)

(73) Assignee: National Refrigeration & Air Conditioning Canada Corp., Brantford, Ontario (CA)

( * ) Notice: Subject to any disclaimer, the term of this patent is extended or adjusted under 35 U.S.C. 154(b) by 211 days.

(21) Appl. No.: 14/080,985

(22) Filed: Nov. 15, 2013

(65) Prior Publication Data

US 2014/0075971 A1    Mar. 20, 2014

Related U.S. Application Data (63) Continuation of application No. 12/696,465, filed on Jan. 29, 2010, now Pat. No. 8,635,883.

(60) Provisional application No. 61/148,451, filed on Jan. 30, 2009.

(51) Int. Cl.
*F25D 17/04* (2006.01)
*F25B 39/02* (2006.01)
*F25B 49/02* (2006.01)

(52) U.S. Cl.
CPC ............... *F25B 39/02* (2013.01); *F25B 49/02* (2013.01); *F25B 2600/0251* (2013.01); *F25B 2600/112* (2013.01); *Y02B 30/743* (2013.01)

(58) Field of Classification Search
CPC .. F25B 42/02; F25B 39/02; F25B 2600/0251; F25B 2600/112; Y02B 30/742
See application file for complete search history.

(56) References Cited

U.S. PATENT DOCUMENTS

| | | | |
|---|---|---|---|
| 2,049,329 A * | 7/1936 | Smith | ............................ 62/207 |
| 2,253,657 A | 8/1941 | Smith | |
| 3,354,665 A | 11/1967 | Lewis | |
| 3,877,243 A | 4/1975 | Kramer | |
| 3,922,874 A | 12/1975 | Canter | |
| 3,959,979 A | 6/1976 | Kramer | |
| 4,049,044 A | 9/1977 | Cohen | |
| 4,075,865 A | 2/1978 | Wills | |
| 4,120,173 A | 10/1978 | Kimpel | |
| 4,137,057 A | 1/1979 | Piet et al. | |
| 4,167,966 A | 9/1979 | Freeman | |
| 5,138,844 A | 8/1992 | Clanin et al. | |

(Continued)

*Primary Examiner* — Cheryl J Tyler
*Assistant Examiner* — Elizabeth Martin (57) ABSTRACT A method of operating an evaporator assembly in which a refrigerant is circulatable to transfer heat out of air in a housing. The evaporator assembly includes a thermostat that completes a solenoid control circuit when the temperature of the air in the housing is above a predetermined cut-in temperature, and opens the solenoid control circuit when the temperature of the air is below a predetermined cut-out temperature. The thermostat completes a fan control circuit when the solenoid control circuit is open, and opens the fan control circuit when the solenoid control circuit is completed. A fan controller detects a signal voltage when the fan control circuit is completed, and provides a first predetermined drive voltage to a fan motor drive. Upon the fan controller failing to detect the signal voltage, a second predetermined drive voltage being greater than the first predetermined drive voltage is provided to the motor drive.

8 Claims, 8 Drawing Sheets

(56) References Cited

U.S. PATENT DOCUMENTS

| | | |
|---|---|---|
| 5,333,469 A | 8/1994 | Hullar et al. |
| 5,477,699 A | 12/1995 | Guess et al. |
| 5,630,323 A | 5/1997 | Niijima et al. |
| 5,797,276 A | 8/1998 | Howenstine et al. |
| 5,983,653 A * | 11/1999 | Lee ................................. 62/186 |
| 6,014,325 A | 1/2000 | Pecore |
| 6,397,612 B1 | 6/2002 | Kernkamp et al. |
| 6,594,554 B1 | 7/2003 | Seem et al. |
| 7,151,349 B1 | 12/2006 | Williamson et al. |
| 7,275,387 B2 | 10/2007 | Gist et al. |
| 7,340,907 B2 | 3/2008 | Vogh, III |
| 8,635,883 B2 | 1/2014 | Zolli et al. |
| 2007/0256437 A1 | 11/2007 | Singh et al. |

* cited by examiner

METHOD OF OPERATING AN EVAPORATOR ASSEMBLY WITH A FAN CONTROLLER

This application is a continuation of U.S. patent application Ser. No. 12/696,465, filed Jan. 29, 2010, and claims the benefit of U.S. Provisional Application No. 61/148,451, filed Jan. 30, 2009 and hereby incorporates such applications in their entirety by reference.

FIELD OF THE INVENTION

The present invention is a method of operating an evaporator assembly with a fan controller.

BACKGROUND OF THE INVENTION

As is well known in the art, in a refrigeration unit utilizing the vapor compression cycle, a compressor circulates a refrigerant from an evaporator through a condenser and an expansion valve and back to the evaporator. The refrigeration unit also includes a housing defining a volume of air in which the temperature is to be controlled. For example, walk-in housings for commercial applications are well known in the art. The refrigeration unit may be a cooler or a freezer.

The evaporator typically is included in an evaporator assembly, which includes one or more fans which are rotated to circulate air in the housing, and in particular, to move air through the evaporator. Typically, the refrigeration unit includes a thermostat positioned in the housing for regulating the temperature of the air inside the housing within a desired range of temperatures. As is well known in the art, the thermostat generates signals which cause activation or de-activation of the compressor, as required to maintain the temperature of the air in the housing within the desired range. However, in the prior art, the fans typically are rotated at a substantially constant speed, regardless of whether the compressor is activated.

Figure 1:
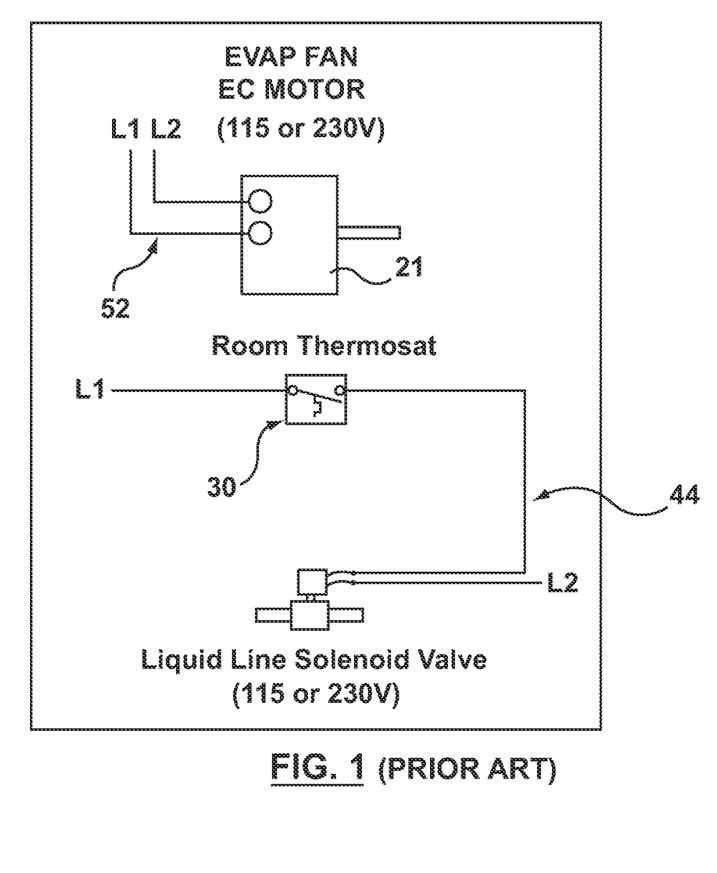
FIG. 1 (also described previously) is a schematic diagram illustrating a control circuit of the prior art.

In the prior art, the thermostat often controls the operation of the compressor via a liquid line solenoid (i.e., a solenoid valve subassembly), which controls the flow of the refrigerant into the evaporator. A typical solenoid control circuit 44 is schematically illustrated in FIG. 1. (As will be described, the remainder of the drawings illustrate the present invention.) As shown in FIG. 1, in the prior art, a fan control circuit 52 and the solenoid control circuit 44 are not operably connected.

For example, a typical prior art solenoid control circuit 44 includes two wires (identified as L1 and L2, which may be a live and a neutral conductor), and a thermostat 30 which completes the solenoid control circuit 44 when the temperature of the air in the housing (not shown) is above a predetermined cut-in temperature, as is known. Upon its energization, the solenoid valve included in the solenoid valve subassembly opens, and while energized the valve remains open, permitting the refrigerant to circulate. As is well known in the art, after the refrigerant passes through the evaporator, the refrigerant is drawn back to the compressor.

Once a predetermined cut-out temperature is reached, the thermostat 30 opens the solenoid control circuit. Upon its de-energization, the solenoid closes, preventing circulation of the refrigerant. The refrigerant which is in the evaporator when the solenoid closes is drawn out of the evaporator by the compressor, i.e., the compressor continues to operate for a limited time. Once substantially all the refrigerant has been removed from the evaporator, a pressure switch opens an electrical circuit (not shown) to the compressor, and the compressor is de-activated, as is known. While the compressor is de-activated, the temperature of the air in the housing gradually increases, due to transfer of heat from outside the housing to its interior.

A typical evaporator assembly includes a number of fans driven by a number of electric fan motors respectively. However, it will be understood that, to simplify the description herein, reference is generally made to an evaporator assembly including a single fan motor rotating a fan.

The prior art fan control circuit 52 includes only first and second conductors L1, L2, i.e., a fan motor 21 operates when there is a sufficient predetermined voltage between the first and second conductors. While the prior art fan motor is energized, it operates at a substantially constant speed, because there is a substantially constant voltage provided between the first and second conductors while the prior art refrigeration unit operates, i.e., regardless of whether the compressor is activated. As noted above and as schematically represented in FIG. 1, the prior art fan control circuit 52 (which controls one or more fan motors 21) is independent of the prior art solenoid control circuit 44.

As is known, the electrical power supplied may be 230V or 120V. If 120V power is provided, then L1 and L2 are live and neutral conductors respectively. If 230V power is provided, then L1 and L2 are both considered live. Accordingly, for the purposes hereof, L1 and L2 are referred to generically hereinafter as a "first" and a "second" conductor respectively.

In the prior art and as described above, the fans in the evaporator assembly typically are rotated at a substantially constant speed, regardless of whether the compressor is operating or not. This is done because some air circulation in the housing while the compressor is de-activated is desirable, to maintain a substantially uniform air temperature inside the housing (i.e., while the air temperature inside the housing gradually increases over time).

Also, in a cooler, when the compressor is de-activated (i.e., the thermostat has cycled off), air circulation melts frost on the fins in the evaporator, i.e., the air circulation serves to defrost the refrigeration unit.

However, it appears that the benefits of air circulation while the compressor is de-activated would be available if the fans rotated at reduced speed(s). Accordingly, operating the fans in the evaporator assembly at a substantially constant speed is wasteful, to the extent that more energy is consumed in rotating the fans than is necessary to achieve the benefits of air circulation within the housing.

SUMMARY OF THE INVENTION

In its broad aspect, the invention provides a method of operating an evaporator assembly in which a refrigerant is circulatable to transfer heat out of air in a housing. The method includes compressing the refrigerant in a compressor through which the refrigerant is circulatable, and causing the refrigerant to at least partially evaporate in an evaporator assembly through which the refrigerant is circulatable. The evaporator assembly includes an evaporator in fluid communication with the compressor and a solenoid valve subassembly configured to control circulation of the refrigerant, the solenoid valve subassembly being switchable between an open condition, in which the refrigerant is circulatable, and a closed condition, in which the refrigerant is substantially non-circulatable. The evaporator assembly also includes a thermostat electrically connectable to the solenoid valve subassembly via a solenoid control circuit, the thermostat having a single pole double throw switch configured to complete the solenoid control circuit when the temperature of the air in the housing is above a predetermined cut-in temperature, and to open the solenoid control circuit when the temperature of the air is below a predetermined cut-out temperature. The solenoid valve subassembly is configured to be in the open condition when the solenoid control circuit is energized, and in the closed condition when the solenoid control circuit is open. The evaporator assembly also includes one or more fans for circulating the air in the housing, and one or more electronically commutated fan motors configured to rotate the fans, each fan motor being operable when a drive voltage is provided to a motor drive thereof across a first conductor and a second conductor. Each fan motor including a fan controller configured to control the drive voltage, the fan controller being electrically connected with the first and second conductors. The evaporator assembly additionally includes a fan control circuit including a third wire, and the first conductor electrically connected with the fan controller, the thermostat being configured to complete the fan control circuit when the solenoid control circuit is open, and to open the fan control circuit when the solenoid control circuit is completed. The method also includes the step of with the fan controller, detecting a signal voltage present between the third wire and the first conductor when the fan control circuit is completed, and providing a first predetermined drive voltage to the motor drive when the signal voltage is detected. Next, with the fan controller, a second predetermined drive voltage is provided to the motor drive upon the fan controller failing to detect the signal voltage, the second predetermined drive voltage being greater than the first predetermined drive voltage. The fan motor operates when the temperature of the air in the housing is above the cut-in temperature (when the solenoid valve subassembly is in the open condition), in which the refrigerant is circulatable, and below the cut-out temperature (when the solenoid valve subassembly is in the closed condition), in which the refrigerant is substantially non-circulatable.

In another aspect, the invention provides a method of reducing energy consumption by adapting an evaporator assembly, through which a refrigerant is circulated to transfer heat out of a volume of air in a housing in which the evaporator assembly is at least partially disposed. The evaporator assembly includes an evaporator in fluid communication with a compressor configured to compress the refrigerant and a solenoid valve subassembly configured to control circulation of the refrigerant. The solenoid valve subassembly is switchable between an open condition, in which the refrigerant is circulatable, and a closed condition, in which the refrigerant is substantially non-circulatable. The method includes coupling into the evaporator assembly a thermostat electrically connectable to the solenoid valve subassembly via a solenoid control circuit. The thermostat includes a single pole double throw switch configured to complete the solenoid control circuit when the temperature of the air in the housing is above a cut-in temperature, and to open the solenoid control circuit when the temperature of the air is below a cut-out temperature. The solenoid valve subassembly is configured to be in the open condition when the solenoid control circuit is energized, and in the closed condition when the solenoid control circuit is open. One or more fans configured to circulate the air in the housing are included in the evaporator assembly. One or more electronically commutated fan motors configured to rotate the fans are also included in the evaporator assembly. Each fan motor is operable when a drive voltage is provided to a motor drive thereof across a first conductor and a second conductor connected thereto. In each fan motor, a fan controller is provided that is configured to control the drive voltage, the fan controller being electrically connected with the first and second conductors. A fan control circuit is electrically connected with the fan controller, the fan control circuit including a third wire and the first conductor. The fan control circuit is configured to be completed by the single pole double throw switch when the solenoid control circuit is open, and the fan control circuit is also configured to be opened by the single pole double throw switch when the solenoid control circuit is completed. With the fan controller, a signal voltage is detected, the signal voltage being present between the third wire and the first conductor when the fan control circuit is completed. With the fan controller, a first predetermined drive voltage is provided to the motor drive when the signal voltage is detected, the first predetermined drive voltage being greater than zero. With the fan controller, a second predetermined drive voltage is provided to the motor drive upon the fan controller failing to detect the signal voltage, the second predetermined drive voltage being greater than the first predetermined drive voltage, and the second predetermined drive voltage being greater than zero. The fan motor is operated when the temperature of the air in the housing is both above the cut-in temperature, when the solenoid valve subassembly is in the open condition, in which the refrigerant is circulatable, and below the cut-out temperature, when the solenoid valve subassembly is in the closed condition, in which the refrigerant is substantially non-circulatable.

In another of its aspects, the invention provides a method of reducing a refrigeration system's energy consumption in which the refrigeration system is retrofitted with at least a third wire. The method includes providing a compressor through which a refrigerant is circulatable, for compressing the refrigerant, and providing an evaporator assembly through which the refrigerant is circulatable for heat transfer from air in a housing to the refrigerant. The evaporator assembly includes an evaporator in fluid communication with the compressor, and a solenoid valve subassembly configured to control circulation of the refrigerant, the solenoid valve subassembly being switchable between an open condition, in which the refrigerant is circulatable, and a closed condition, in which the refrigerant is substantially non-circulatable. The evaporator assembly also includes a thermostat electrically connectable to the solenoid valve subassembly via a solenoid control circuit, the thermostat including a single pole double throw switch configured to complete the solenoid control circuit when the temperature of the air in the housing is above a predetermined cut-in temperature, and to open the solenoid control circuit when the temperature of the air is below a predetermined cut-out temperature. The solenoid valve subassembly is configured to be in the open condition when the solenoid control circuit is energized, and in the closed condition when the solenoid control circuit is open. In addition, the evaporator assembly also includes one or more fans for circulating the air in the housing, and one or more electronically commutated fan motors configured to rotate the fans, each fan motor being operable when a drive voltage is provided to a motor drive thereof across a first conductor and a second conductor. Each fan motor includes a fan controller configured to control the drive voltage, the fan controller being electrically connected with the first and second conductors. The evaporator assembly additionally includes a fan control circuit including the third wire, and the first conductor electrically connected with the fan controller. The thermostat is configured to complete the fan control circuit when the solenoid control circuit is open, and to open the fan control circuit when the solenoid control circuit is completed. With the fan controller, a signal voltage is detected, if present, between the third wire and the first conductor when the fan control circuit is completed, and the fan controller then provides a first predetermined drive voltage to the motor drive when the signal voltage is detected. With the fan controller, a second predetermined drive voltage is provided to the motor drive upon the fan controller failing to detect the signal voltage, the second predetermined drive voltage being greater than the first predetermined drive voltage. The fan motor is operated when the temperature of the air in the housing is above the cut-in temperature, when the solenoid valve subassembly is in the open condition, in which the refrigerant is circulatable, and below the cut-out temperature, when the solenoid valve subassembly is in the closed condition, in which the refrigerant is substantially non-circulatable.

BRIEF DESCRIPTION OF THE DRAWINGS

The invention will be better understood with reference to the drawings, in which.

DETAILED DESCRIPTION

To simplify the description, the reference numerals used previously in FIG. 1 will be used again, except that each such reference numeral is raised by 100 (or multiples thereof, as the case may be), where the parts described correspond generally to prior art parts already described.

Figure 2A:
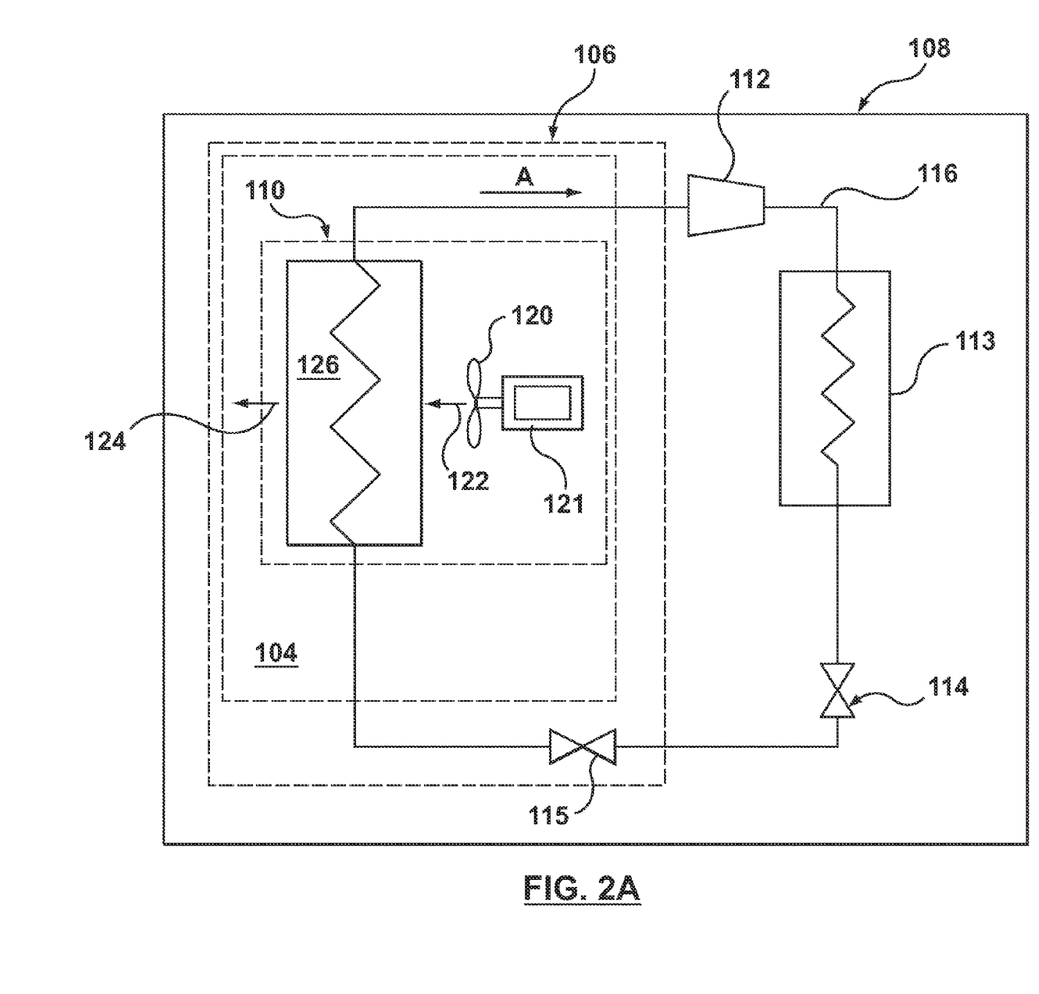
FIG. 2A is a schematic diagram illustrating an embodiment of a refrigeration unit of the present invention.
Figure 2B:
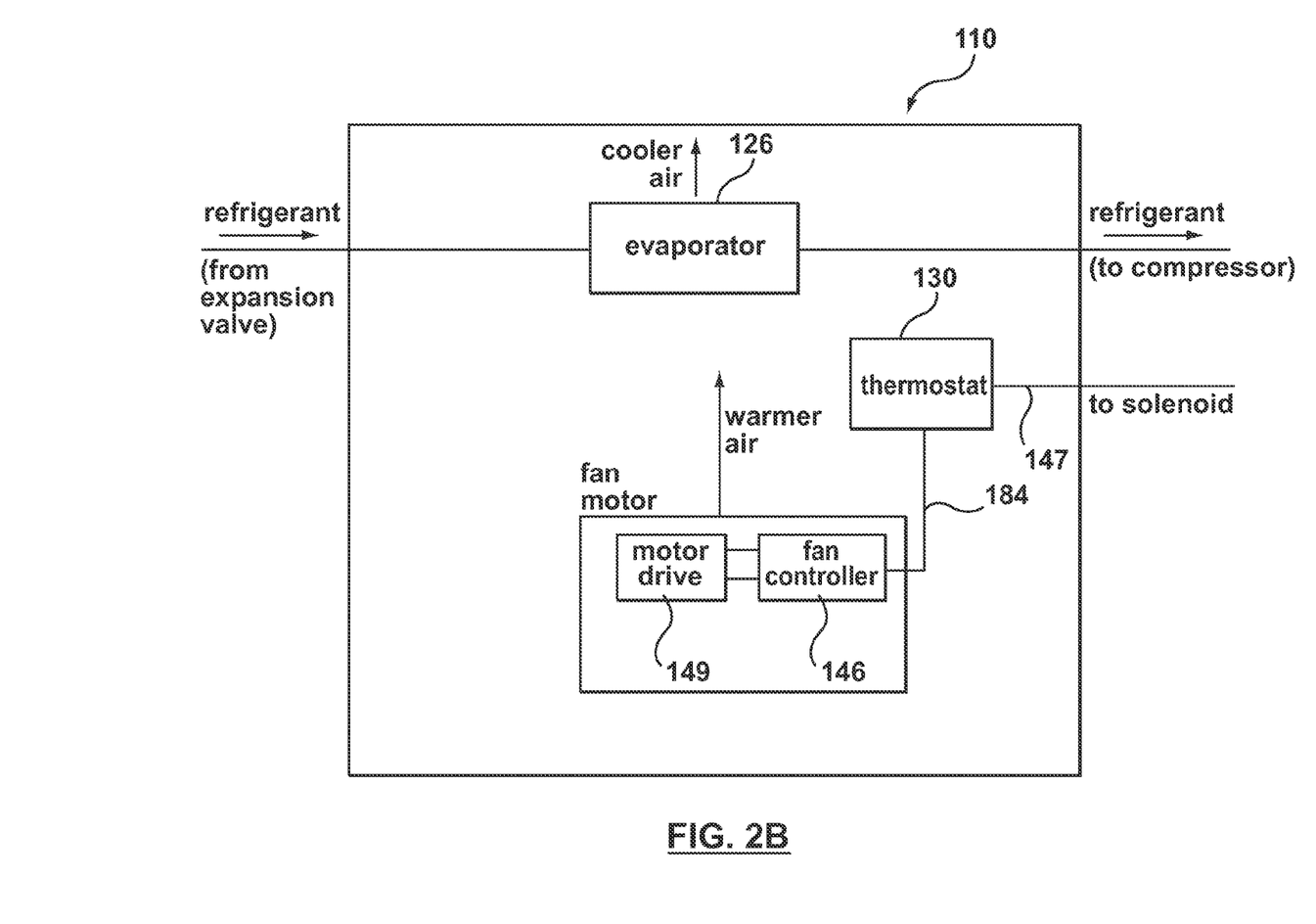
FIG. 2B is a schematic diagram illustrating an embodiment of an evaporator assembly of the invention.
Figure 3A:
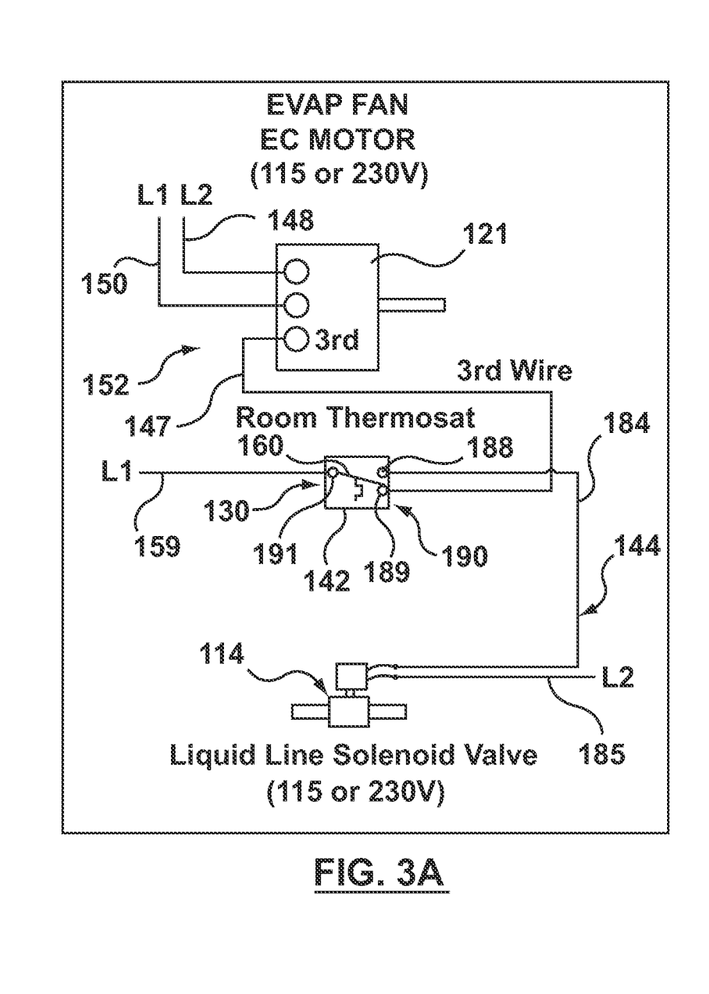
FIG. 3A is a schematic diagram illustrating embodiments of control circuits of the invention, in which a solenoid control circuit is opened.
Figure 3B:
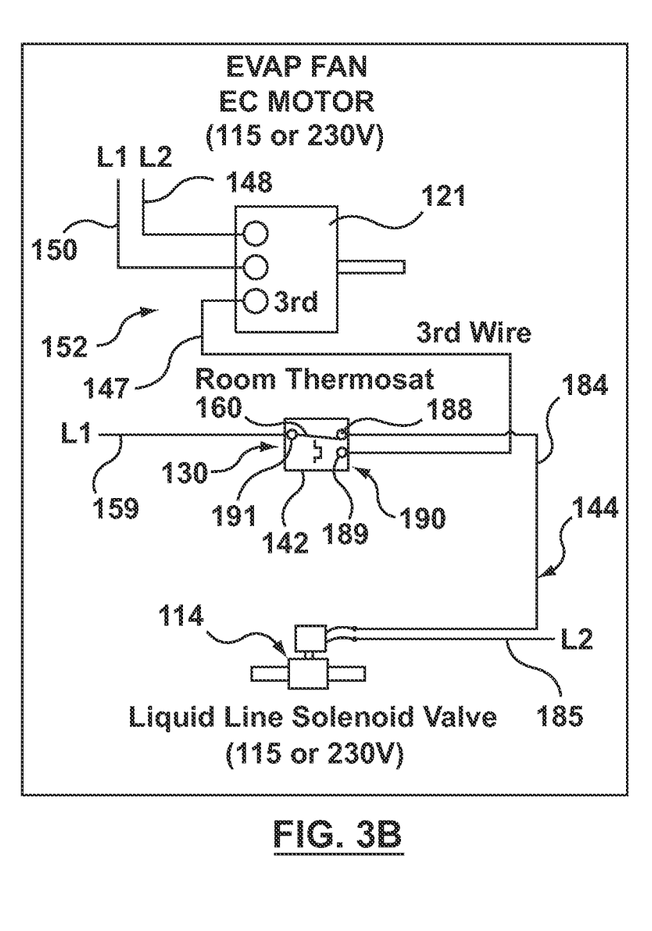
FIG. 3B is a schematic diagram illustrating embodiments of control circuits of the invention, in which the solenoid control circuit is completed.

Reference is first made to FIGS. 2A, 2B, 3A, and 3B to describe an embodiment of an evaporator assembly 110 of the invention. The evaporator assembly 110 (FIG. 2B) is adapted for flow of a refrigerant (not shown) therethrough to transfer heat out of a volume of air 104 in a housing 106 in which the evaporator assembly 110 is at least partially disposed (FIG. 2A). In one embodiment, the evaporator assembly 110 preferably includes an evaporator 126 in fluid communication with a compressor 112 for compressing the refrigerant (FIG. 2A). As is schematically shown in FIG. 2A, the circulation of the refrigerant preferably is controlled by a liquid line solenoid valve subassembly 114 which is switchable between an open condition, in which the refrigerant is circulatable, and a closed condition, in which the refrigerant is substantially non-circulatable. As will be described, the evaporator assembly 110 also includes a thermostat 130 (FIGS. 2B, 3A, 3B) which is electrically connectable to the solenoid valve subassembly 114 via a solenoid control circuit 144 (FIGS. 3A, 3B). Preferably, the thermostat 130 is adapted, or set, to complete the solenoid control circuit 144 when the temperature of the air in the housing is above a cut-in temperature, and to open the solenoid control circuit 144 when the temperature of the air in the housing is below a cut-out temperature. The solenoid valve subassembly 114 preferably is defaulted to be in the closed condition when the solenoid control circuit 144 is not energized. Preferably, the thermostat 130 includes a switch 142 for completing the solenoid control circuit 144 which allows current to flow through the thermostat 130 to the solenoid valve subassembly 114, to energize the solenoid, switching the solenoid valve subassembly 114 to the open condition.

The evaporator assembly 110 of the present invention preferably also includes one or more fans 120 (FIG. 2A) for circulating the air in the housing, and one or more fan motors 121 for rotating the fans. As will be appreciated by those skilled in the art, a supply voltage is supplied to the fan motor 121 across the first and second conductors. Each fan motor 121 is operable when a drive voltage is provided thereto across a first conductor 150 and a second conductor 148 connected thereto (FIGS. 3A, 3B). The fan motor 121 preferably is an EC (electronically commutated) motor. The EC motor 121 includes a fan controller 146 for controlling the drive voltage provided to a motor drive 149 of the fan motor 121 (FIG. 2B). The drive voltage provided to the motor drive 149 has a direct relationship to the speed at which the fan on the fan motor rotates. (It will be understood that elements of the evaporator assembly 110 of the invention are omitted from FIG. 2B for clarity of illustration.)

Typically, AC power is provided via the first and second conductors. The supply voltage (AC) across the first and second conductors 148, 150 is substantially constant. The AC voltage is converted to DC drive voltage by the fan controller 146 in the conventional manner, and the fan controller feeds the motor drive 149 in the fan motor 121.

As shown in FIGS. 3A and 3B, the thermostat 130 preferably is also electrically connectable to the fan controller 146 via a fan control circuit 152. The fan control circuit 152 includes a third wire 147 and the first conductor 150 (L1). As will be described, the thermostat 130 is adapted to complete the fan control circuit 152 upon opening the solenoid control circuit 144, and to open the fan control circuit 152 upon completing the solenoid control circuit 144. When the fan control circuit is closed, the signal voltage is across the third wire 147 and the first conductor 150. The controller 146 is adapted to sense either (i) a signal voltage (i.e., 120V or 230V, as required) across the third wire 147 and the first conductor 150, or (ii) a lack of voltage across those two conductors.

Preferably, the fan controller 146 is also programmed to provide one of two possible drive voltages (DC) to the motor drive 149. In particular, the controller 146 preferably is adapted to provide a first predetermined drive voltage to the motor drive 149 upon the fan controller detecting the signal voltage. It is preferred that the fan controller 146 is adapted to provide a second predetermined drive voltage to the motor drive 149 upon the fan controller failing to detect the signal voltage.

From the foregoing, it can be seen that, when the fan control circuit 152 is open, the controller 146 senses no voltage present across the third wire 147 and the first conductor 150. Upon the controller 146 failing to detect the signal voltage, in accordance with its programming, the fan controller 146 provides the second predetermined drive voltage to the motor drive 149.

As noted above, when the fan control circuit 152 is completed, the controller 146 senses the signal voltage (120V or 230V) between the third wire 147 and the first conductor 150. Upon the controller 146 detecting the signal voltage, the controller 146 decreases the drive voltage provided to the motor drive 149 to the first predetermined drive voltage.

In accordance with the foregoing, the fan motor 121 operates at different speeds due to the different drive voltages provided to the motor drive 149 respectively. The drive voltage which is provided to the motor drive 149 is determined by whether the fan controller 146 detects the signal voltage or not. The second predetermined drive voltage is greater than the first predetermined drive voltage. The result is that the fans are rotated at a lower speed when the solenoid control circuit 144 is open, and at a higher speed when the solenoid control circuit is closed.

The solenoid control circuit 144 preferably includes a first conductor 184 and a second conductor 185 (FIGS. 3A, 3B). When the solenoid control circuit 144 is closed, the single wire 159 and the first conductor 184 are electrically connected (FIG. 3B). When the solenoid control circuit 144 is closed, a voltage (e.g., 120V or 230V) preferably is applied across the single wire 159 and a second conductor 185, to energize the solenoid valve subassembly 114.

Those skilled in the art will appreciate that the switch 142 may be any suitable switch device. As shown in FIGS. 3A and 3B, in one embodiment, the switch 142 preferably is a single pole double throw switch. The switch 142 includes a contact 160 in the switch electrically connectable to the first conductor 184 at a first contact point 188 (i.e., to close the solenoid control circuit, and to open the fan control circuit) and, alternatively, electrically connectable to the third wire 147 at a second contact point 189 (i.e., to close the fan control circuit, and to open the solenoid control circuit).

The switch 142 preferably is also connected to a single wire 159 (L1) at a third contact point 191 (FIGS. 3A, 3B). Preferably, the third wire 147 connects the single wire 159 and the fan controller 146 when the fan control circuit 152 is closed (FIG. 3B).

As in a conventional solenoid valve, the solenoid valve subassembly 114 includes a plunger adapted to fit in a seat opening and a solenoid for moving the plunger into engagement with and off the seat (not shown). The plug or gate is movable between an open position, in which the refrigerant is circulatable, and a closed position, in which the refrigerant is substantially non-circulatable. When the plug or gate is in the open position, the solenoid valve subassembly is in the open condition, and when the plug or gate is in the closed position, the solenoid valve subassembly is in the closed condition. Because the operation and elements of the solenoid valve subassembly 114 are conventional, further description thereof is unnecessary.

Preferably, the evaporator assembly 110 is included in a refrigeration unit 108 of the invention (FIG. 2A). As noted above, the refrigeration unit 108 may be, for example, a cooler or a freezer, and the refrigeration unit is adapted to cool the volume of air 104 in the housing 106 (FIG. 2A). The cut-in temperature is higher than the cut-out temperature.

In one embodiment, the present invention is included in a refrigeration unit 108 employing the vapor compression cycle to transfer heat out of the volume of air in the housing. In the refrigeration unit 108 of the present invention, the refrigerant is circulated within the line 116 in the direction of arrow "A" when the liquid line solenoid valve subassembly 114 is in the open condition (FIG. 2A), from the evaporator 126 to a compressor 112, a condenser 113, the solenoid valve 114, an expansion valve 115, and back to the evaporator 126. Inside the housing 106, the fan(s) 120 rotated by the fan motor(s) 121 cause warmer air to be moved through (or over) the evaporator 126 (as indicated by arrow 122), so that heat therein is transferred from the air to the refrigerant in the evaporator 126, and air exiting the evaporator 126 (as indicated at arrow 124) is cooler, as in a conventional evaporator (FIG. 2A).

In use, cut-in and cut-out temperatures are entered into the thermostat 130. It will be appreciated that a desired set temperature may be entered into the thermostat 130 manually, programmatically, or in any other suitable fashion, as is conventional. The desired cut-in and cut-out temperatures depend on a variety of factors, such as but not limited to, the volume capacity of the housing, and the amount and type of materials to be stored within the housing. As an example, a restaurant may employ the evaporator assembly 110 of the present invention to keep meat products (not shown) stored in the housing frozen below a specific set temperature. It will be apparent that, for health and other reasons, the meat products of the above example must be kept at or below the set temperature at all times when the meat products are located within the housing. When the air within the housing is above the desired set temperature, the evaporator assembly 110 is adapted to be in cooling mode, meaning that the refrigerant is allowed to circulate through the solenoid valve subassembly 114, and through the evaporator 126 in the direction of arrow "A" (FIG. 2A). When the evaporator assembly 110 is operating in cooling mode, the fan motor 121 rotates at a faster speed than when the evaporator assembly 110 is operating in circulation mode. The thermostat 130 is operable to monitor continually the temperature of the air within the housing, in the conventional manner.

Also, when the air within the housing is above the cut-in temperature, the thermostat switch 142 is closed, which completes the solenoid control circuit 144. The controller 146 senses no voltage between the third wire 147 and the first conductor 150 (L1), and causes the higher predetermined voltage (i.e., the second predetermined voltage) to be provided to the motor drive. When the fan motor 121 is operating at the higher speed, the motor is rotating at the speed required for cooling mode.

From the foregoing, it can be seen that the invention provides a simple means for reducing energy consumption. The invention involves only a third wire and, preferably, a simple single pole double throw switch, which are positionable in the evaporator assembly. There is no requirement to add other, more costly elements, e.g., a third controller.

Those skilled in the art will appreciate that in one embodiment, the invention may be used to modify an existing refrigeration system. For example, in another embodiment, the invention preferably includes a kit of parts 190 including the third wire 147 and the switch 142, which preferably is included in the thermostat 130 (FIGS. 3A, 3B). As shown in FIGS. 3A and 3B, the third wire 147 preferably is connected to the switch 142 at the second contact point 189. The third wire 147 preferably is also connected to the fan motor 121. In addition, the first conductor 184 is connected to the switch 142 (of the thermostat 130) at the first contact point 188 therein (FIGS. 3A, 3B).

As can be seen in comparing the schematic diagrams of the prior art arrangement in FIG. 1 and the invention in FIGS. 3A and 3B, upon installation of the kit 190 of the invention, the switch 42 of the prior art thermostat is replaced by the switch 142 (e.g., a single pole double-throw switch) of the thermostat 130 of the invention. Also, the fan motor 121 (i.e., the fan controller 146 thereof) and the thermostat 130 are connectable via the third wire 147. Accordingly, those skilled in the art will appreciate that the kit 190 can be installed in an existing refrigeration system relatively easily, at minimal expense and without extensive downtime.

Figure 4:
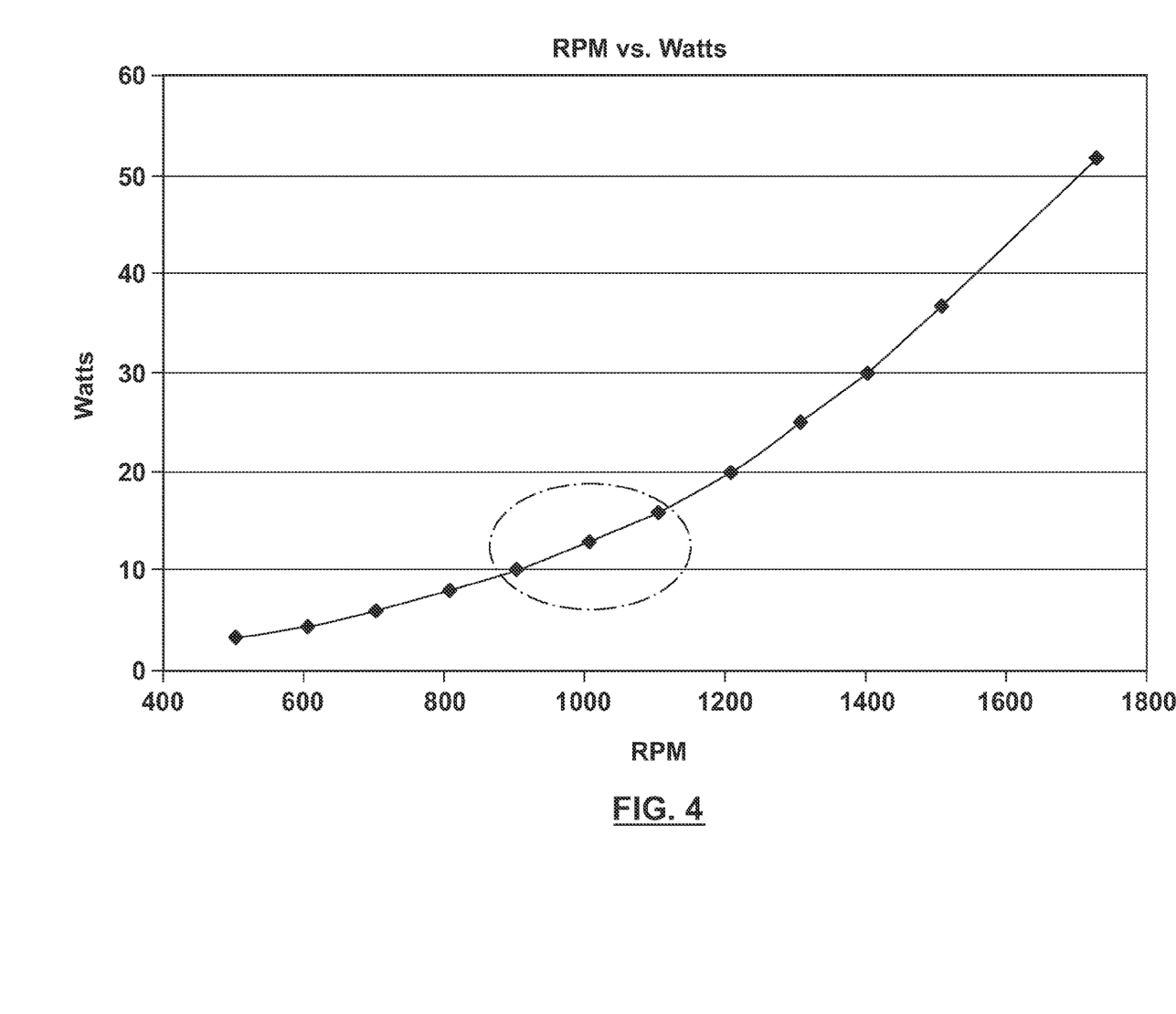
FIG. 4 is an exemplary plot of the speed of rotation of a fan motor against power consumption thereof, in a particular application.

FIG. 4 is a graph illustrating the relationship between the power consumed by an exemplary fan motor (indicated on the vertical axis, in watts) and the speed at which an exemplary fan motor of the present invention is rotating (indicated on the horizontal axis, in revolutions per minute (rpm)). As shown, the fan motor consumes variable amounts of power while it rotates at different speeds and the relationship between the power consumed and the speed is non-linear as indicated by the curve. As described above, for a particular application of the evaporator assembly of the invention, there is a minimum speed at which the fan motor preferably rotates to provide sufficient air circulation within the housing to maintain a substantially uniform air temperature inside the housing and to retard the formation of frost on surfaces inside the housing.

For example, for the application illustrated in FIG. 4, the fan motor preferably rotates at between about 900 and about 1100 rpm when the evaporator assembly of the invention is operating in circulation mode. The region in which the fan motor operates in circulation mode is generally indicated by the circled part of the curve. In the example illustrated in FIG. 4, the slope of the curve is substantially flatter within the circle as compared to the slope of the curve at higher rpms, e.g., between about 1,400 rpm and about 1,700 rpm. Preferably, the fan motor rotates at about 1,730 rpm when the evaporator assembly is in cooling mode. As shown, the fan motor consumes approximately 10 watts while rotating at approximately 900 rpm and approximately 17 watts while rotating at approximately 1,100 rpm. It is apparent from FIG. 4 that the evaporator assembly of the invention consumes significantly less energy while operating in circulation mode than when in cooling mode.

Figure 5:
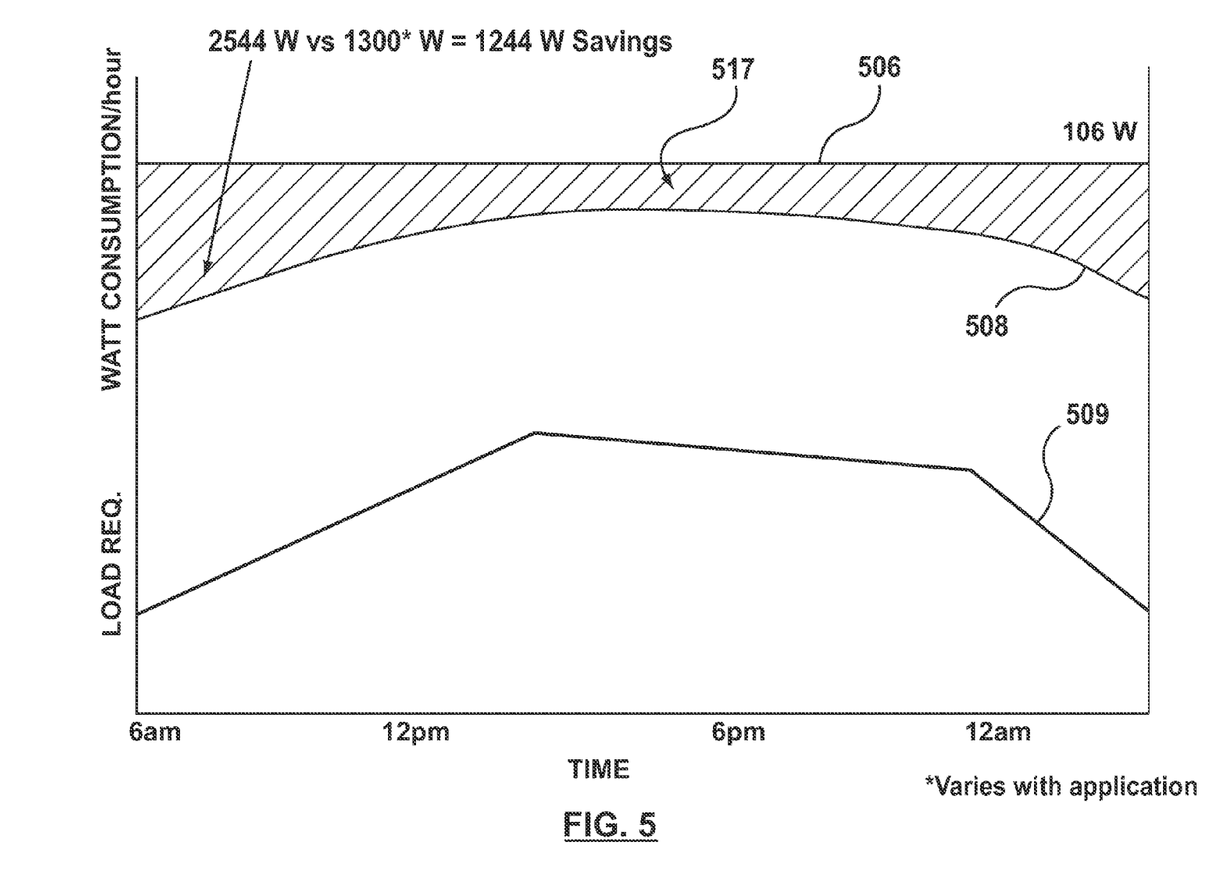
FIG. 5 is an exemplary plot providing a graphic comparison of power consumption by a fan motor with a prior art fan control circuit and a fan motor with a fan control circuit of the invention, in a particular application.

Reference is next made to FIG. 5, which illustrates the greater energy efficiency of the evaporator assembly of the invention as compared to an evaporator assembly of the prior art. In FIG. 5, the graph includes a vertical axis for indicating the power consumed in watts, and different times of the day are indicated on the horizontal axis, for an exemplary application of the evaporator assembly of the invention. The line 506 represents the power consumed by an evaporator assembly of the prior art which is operating at a constant power of approximately 106 W for the entire day. Over the 24-hour period illustrated in FIG. 5, the evaporator assembly of the prior art consumes 2544 W.hrs. The line 508 represents the power consumed by an exemplary evaporator assembly 110 of the present invention. Line 509 illustrates the minimum power that is required at each point of the day to meet the needs of the application. As shown, the power required "peaks" at mid-afternoon which is generally the warmest part of the day. It will be appreciated that the line 509 will typically be different for each day and will vary throughout the year. In the example illustrated in FIG. 5, the evaporator assembly of the invention consumes a variable amount of power throughout the day as indicated by the line 508. As shown in FIG. 5, the evaporator assembly of the invention consumes less power than the evaporator assembly of the prior art but is still able to meet the minimum power required by the application. The region identified as 517 in FIG. 5 represents the energy that is saved by employing the evaporator assembly of the present invention over the evaporator assembly of the prior art. It has been found that for the exemplary application illustrated in FIG. 5, the evaporator assembly of the present invention consumes 1244 W.hrs less energy than the evaporator assembly of the prior art.

Tests were conducted on an embodiment of a refrigeration system of the invention, to determine whether actual energy consumption would be consistent with the anticipated energy consumption. The relevant details of the test refrigeration system were as follows:

Condensing Unit Model: KESA040L6-HT4A (uses R404A 460V 4 hp Discus compressor) nominal rated at 26,000 Btuh at −20 F SST.

Evaporator Model: KLP422VE-S2A (uses four 230V ⅕ HP fan motors, R404A Nominal rating 22,000 Btuh).

EC Motor Model: 230V G.E. Arktic 59 $^{1000}/_{1725}$ rpm, ⅕ HP.

The test system was set up to provide adequate heat load in a −10 F Freezer Room to maintain a daily (24 hr) compressor run time/off time ratio of 3 to 1 (75% running to 25% not running) over a 22 hour period, and two hours were allocated to total daily (24 hr) defrosting time. Conventional temperature control methods (use of room thermostat) were used to cycle the compressor in order to maintain the −10 F room temperature.

The two methods of comparable operation were noted:
(1) Evaporator fans running full speed at all times (when compressor was either running or off) (referred to as "ECM" in FIGS. 6A and 6B), and
(2) Energy saving mode (i.e., utilizing the invention herein) when evaporator fans ran full speed (when compressor was running) and slow speed mode (when the compressor was off) (referred to as "Invention" in FIGS. 6A and 6B).

Figure 6A:
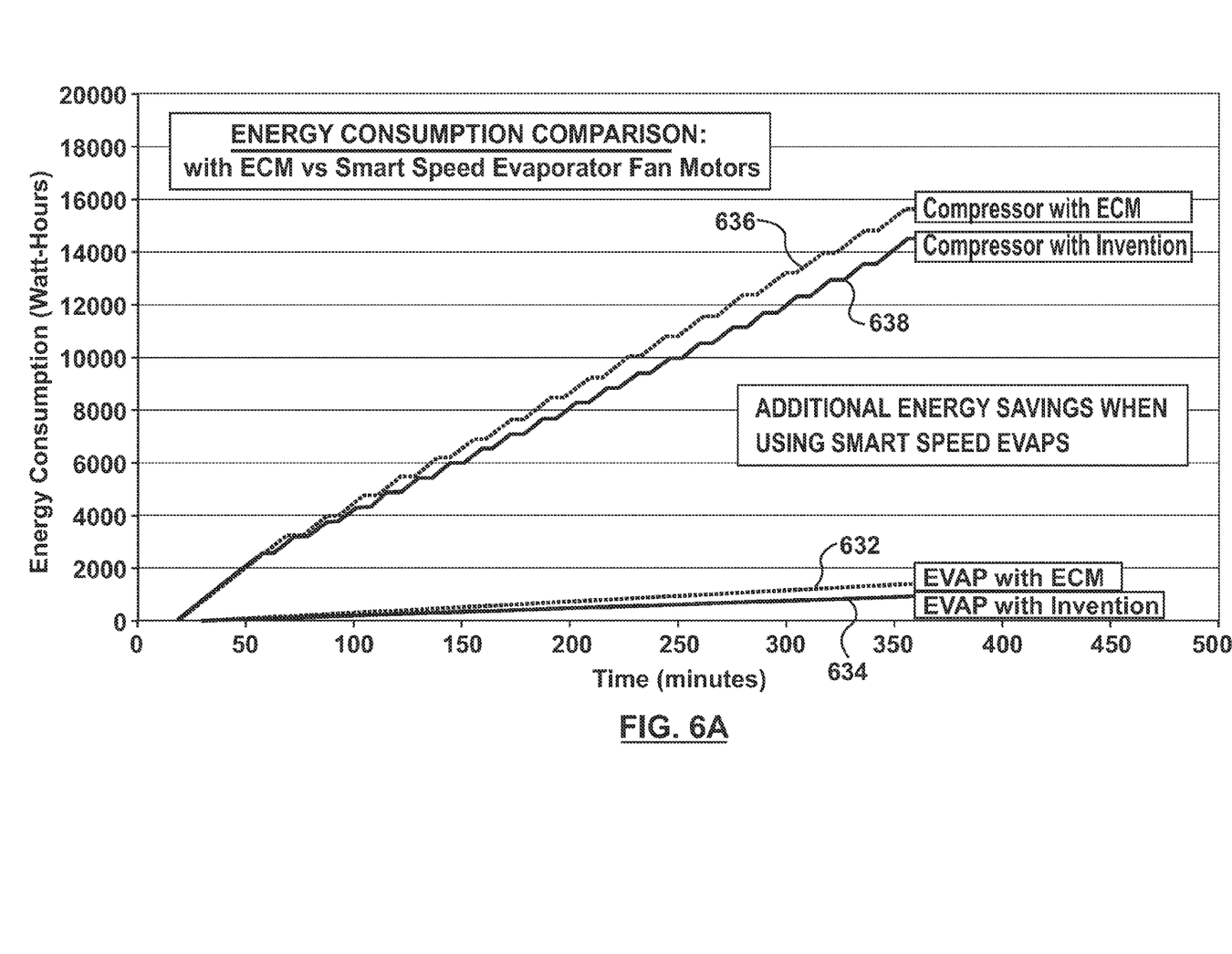
FIG. 6A is a graph showing energy consumption of fan motors and a compressor in a test of an embodiment of a refrigeration system of the invention.
Figure 6B:
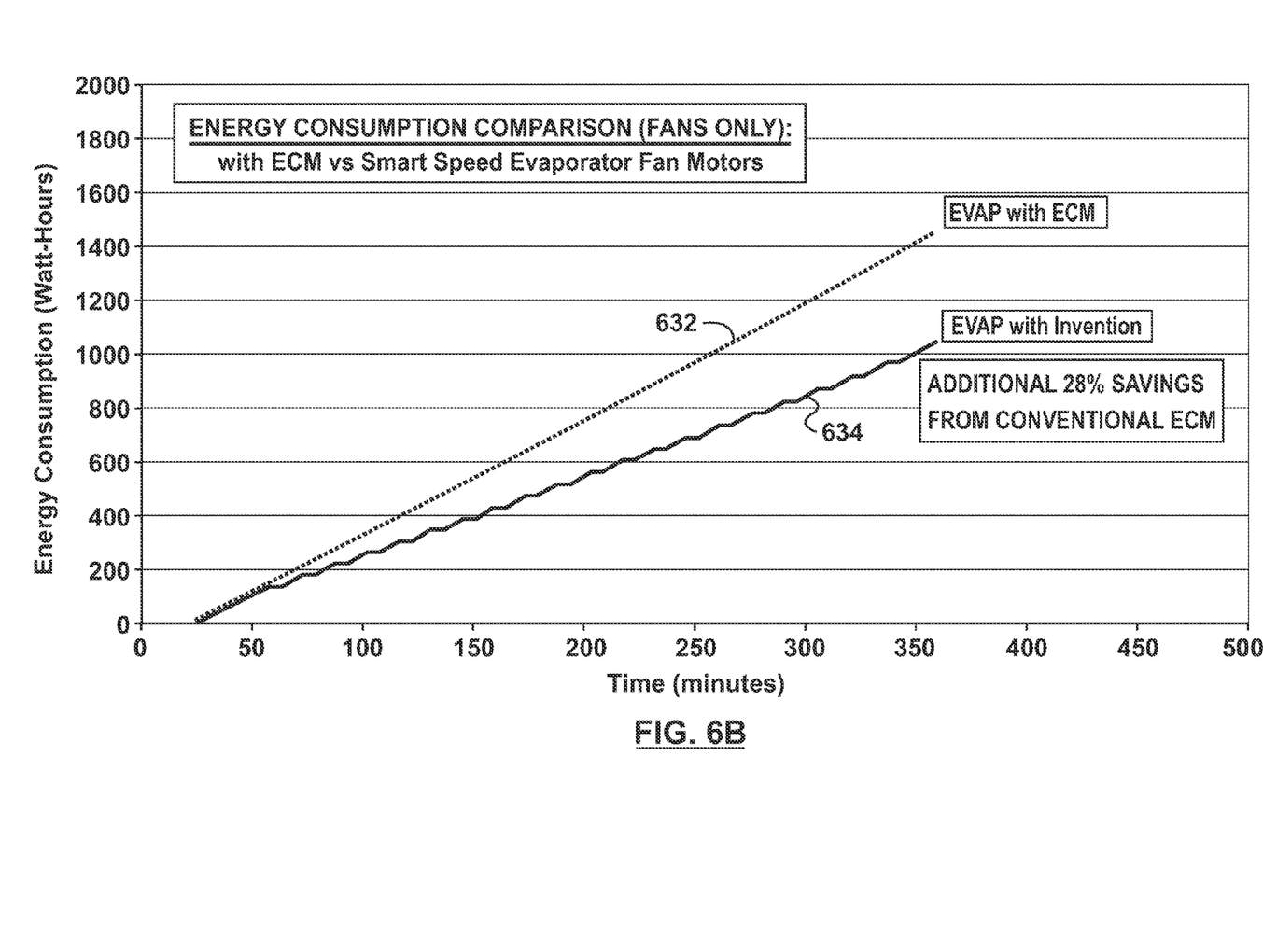
FIG. 6B is a graph showing energy consumption of the fan motors only in the test.

In FIGS. 6A and 6B, the energy consumption of the fan motors in an evaporator assembly with ECM is shown by the line identified by reference numeral 632, and the energy consumption of the fan motors in an evaporator assembly with the invention is shown by the line identified by reference numeral 634. The results of the test for the fan motors are shown more clearly in FIG. 6B, indicating that the fan motors consumed significantly less energy when the invention was utilized, i.e., approximately 28% less. However, FIG. 6A shows that, in the test system, significantly lower compressor wattages were also observed.

The energy consumption of the compressor with ECM is shown by the line identified by reference numeral 636, and the energy consumption of the compressor with the invention is shown by the line identified by reference numeral 638 (FIG. 6A). It appears that the lower compressor wattage when the invention is utilized is a consequence of the more efficient consumption of energy by the fan motors. The invention causes the fan motors to consume less energy (i.e., the invention causes the fan motors to operate more efficiently). Because the fan motors generate heat inside the housing when operating, more efficient operation of the fan motors results in less heat being added to the housing, with the result that the compressor is, in turn, required to work less. Therefore, the compressor consumes significantly less energy when the invention is utilized.

It will also be appreciated by those skilled in the art that the invention can take many forms, and that such forms are within the scope of the invention as described above. The foregoing descriptions are exemplary, and their scope should not be limited to the preferred versions provided herein.

We claim:

1. A method of operating an evaporator assembly in which a refrigerant is circulatable to transfer heat out of air in a housing, the method comprising:
(a) compressing the refrigerant in a compressor through which the refrigerant is circulatable;
(b) causing the refrigerant to at least partially evaporate in an evaporator assembly through which the refrigerant is circulatable, the evaporator assembly comprising:

an evaporator in fluid communication with the compressor;

a solenoid valve subassembly configured to control circulation of the refrigerant, the solenoid valve subassembly being switchable between an open condition, in which the refrigerant is circulatable, and a closed condition, in which the refrigerant is substantially non-circulatable;

a thermostat electrically connectable to the solenoid valve subassembly via a solenoid control circuit, the thermostat comprising a single pole double throw switch configured to complete the solenoid control circuit when the temperature of the air in the housing is above a predetermined cut-in temperature, and to open the solenoid control circuit when the temperature of the air is below a predetermined cut-out temperature;

the solenoid valve subassembly being configured to be in the open condition when the solenoid control circuit is energized, and in the closed condition when the solenoid control circuit is open;

at least one fan for circulating the air in the housing;

at least one electronically commutated fan motor configured to rotate said at least one fan, said at least one fan motor being operable when a drive voltage is provided to a motor drive thereof across a first conductor and a second conductor;

said at least one fan motor comprising a fan controller configured to control the drive voltage, the fan controller being electrically connected with the first and second conductors;

a fan control circuit comprising a third wire and the first conductor electrically connected with the fan controller;

the thermostat being configured to complete the fan control circuit when the solenoid control circuit is open, and to open the fan control circuit when the solenoid control circuit is completed;

(c) with the fan controller, detecting a signal voltage present between the third wire and the first conductor when the fan control circuit is completed, and providing a first predetermined drive voltage to the motor drive when said signal voltage is detected;

(d) with the fan controller, providing a second predetermined drive voltage to the motor drive upon the fan controller failing to detect the signal voltage, the second predetermined drive voltage being greater than the first predetermined drive voltage; and (e) operating said at least one fan motor when the temperature of said air in the housing is above the cut-in temperature, when the solenoid valve subassembly is in the open condition, in which the refrigerant is circulatable, and below the cut-out temperature, when the solenoid valve subassembly is in the closed condition, in which the refrigerant is substantially non-circulatable.

2. A method according to claim 1 in which the first predetermined drive voltage is selected to cause said at least one fan motor to rotate at a minimum speed to provide sufficient air circulation in the housing for maintaining a substantially uniform air temperature inside the housing.

3. A method according to claim 1 in which said at least one fan motor is configured to rotate at a first speed greater than zero when the solenoid valve subassembly is in the closed condition and at a second speed when the solenoid valve subassembly is in the open condition, the second speed set to be greater than said first speed.

4. A method of reducing energy consumption by adapting an evaporator assembly, through which a refrigerant is circulated to transfer heat out of a volume of air in a housing in which the evaporator assembly is at least partially disposed, the evaporator assembly comprising an evaporator in fluid communication with a compressor configured to compress the refrigerant and a solenoid valve subassembly configured to control circulation of the refrigerant, the solenoid valve subassembly being switchable between an open condition, in which the refrigerant is circulatable, and a closed condition, in which the refrigerant is substantially non-circulatable, the method comprising:

(a) coupling into the evaporator assembly a thermostat electrically connectable to the solenoid valve subassembly via a solenoid control circuit, the thermostat comprising a single pole double throw switch configured to complete the solenoid control circuit when the temperature of the air in the housing is above a cut-in temperature, and to open the solenoid control circuit when the temperature of the air is below a cut-out temperature, the solenoid valve subassembly being configured to be in the open condition when the solenoid control circuit is energized, and in the closed condition when the solenoid control circuit is open;

(b) including in the evaporator assembly at least one fan configured to circulate the air in the housing;

(c) additionally including in the evaporator assembly at least one electronically commutated fan motor configured to rotate said at least one fan, said at least one fan motor being operable when a drive voltage is provided to a motor drive thereof across a first conductor and a second conductor connected thereto;

(d) providing, in said at least one fan motor, a fan controller configured to control the drive voltage, the fan controller being electrically connected with the first and second conductors;

(e) electrically connecting a fan control circuit comprising a third wire and the first conductor with the fan controller, the fan control circuit being configured to be completed by the single pole double throw switch when the solenoid control circuit is open, and the fan control circuit being configured to be opened by the single pole double throw switch when the solenoid control circuit is completed;

(f) with the fan controller, detecting a signal voltage present between the third wire and the first conductor when the fan control circuit is completed, and providing a first predetermined drive voltage to the motor drive when said signal voltage is detected, the first predetermined drive voltage being greater than zero;

(g) with the fan controller, providing a second predetermined drive voltage to the motor drive upon the fan controller failing to detect the signal voltage, the second predetermined drive voltage being greater than the first predetermined drive voltage, the second predetermined drive voltage being greater than zero; and (h) operating said at least one fan motor when the temperature of said air in the housing is above the cut-in temperature, when the solenoid valve subassembly is in the open condition, in which the refrigerant is circulatable, and below the cut-out temperature, when the solenoid valve subassembly is in the closed condition, in which the refrigerant is substantially non-circulatable.

5. A method according to claim 4 in which the first predetermined drive voltage is selected to cause said at least one fan motor to rotate at a minimum speed to provide sufficient air circulation in the housing for maintaining a substantially uniform air temperature inside the housing.

6. A method of reducing a refrigeration system's energy consumption in which the refrigeration system is retrofitted with at least a third wire, the method comprising:

(a) providing a compressor through which a refrigerant is circulatable, for compressing the refrigerant;

(b) providing an evaporator assembly through which the refrigerant is circulatable for heat transfer from air in a housing to the refrigerant, the evaporator assembly comprising:

an evaporator in fluid communication with the compressor;

a solenoid valve subassembly configured to control circulation of the refrigerant, the solenoid valve subassembly being switchable between an open condition, in which the refrigerant is circulatable, and a closed condition, in which the refrigerant is substantially non-circulatable;

a thermostat electrically connectable to the solenoid valve subassembly via a solenoid control circuit, the thermostat comprising a single pole double throw switch configured to complete the solenoid control circuit when the temperature of the air in the housing is above a predetermined cut-in temperature, and to open the solenoid control circuit when the temperature of the air is below a predetermined cut-out temperature;

the solenoid valve subassembly being configured to be in the open condition when the solenoid control circuit is energized, and in the closed condition when the solenoid control circuit is open;

at least one fan for circulating the air in the housing;

at least one electronically commutated fan motor configured to rotate said at least one fan, said at least one fan motor being operable when a drive voltage is provided to a motor drive thereof across a first conductor and a second conductor;

said at least one fan motor comprising a fan controller configured to control the drive voltage, the fan controller being electrically connected with the first and second conductors;

a fan control circuit comprising said third wire and the first conductor electrically connected with the fan controller;

the thermostat being configured to complete the fan control circuit when the solenoid control circuit is open, and to open the fan control circuit when the solenoid control circuit is completed;

(c) with the fan controller, detecting a signal voltage present between the third wire and the first conductor when the fan control circuit is completed, and providing a first predetermined drive voltage to the motor drive when said signal voltage is detected;

(d) with the fan controller, providing a second predetermined drive voltage to the motor drive upon the fan controller failing to detect the signal voltage, the second predetermined drive voltage being greater than the first predetermined drive voltage; and (e) operating said at least one fan motor when the temperature of said air in the housing is above the cut-in temperature, when the solenoid valve subassembly is in the open condition, in which the refrigerant is circulatable, and below the cut-out temperature, when the solenoid valve subassembly is in the closed condition, in which the refrigerant is substantially non-circulatable.

7. A method according to claim 6 in which the first predetermined drive voltage is selected to cause said at least one fan motor to rotate at a minimum speed to provide sufficient air circulation in the housing for maintaining a substantially uniform air temperature inside the housing.

8. A method according to claim 6 in which said at least one fan motor is configured to rotate at a first speed greater than zero when the solenoid valve subassembly is in the closed condition and at a second speed when the solenoid valve subassembly is in the open condition, the second speed set to be greater than said first speed.

* * * * *